United States Patent
Yamashita (10) Patent No.: US 9,214,279 B2
(45) Date of Patent: Dec. 15, 2015

(54) ULTRAFINE METAL OXIDE PARTICLE DISPERSION LIQUID AND ULTRAFINE METAL OXIDE PARTICLE THIN FILM

(75) Inventor: Yasuhisa Yamashita, Koka (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 424 days.

(21) Appl. No.: 12/731,527

(22) Filed: Mar. 25, 2010

(65) Prior Publication Data

US 2010/0183803 A1    Jul. 22, 2010

Related U.S. Application Data

(62) Division of application No. 11/052,759, filed on Feb. 9, 2005, now abandoned.

(30) Foreign Application Priority Data

Mar. 4, 2004   (JP) .................................. 2004-060144

(51) Int. Cl.
| | |
|---|---|
| *B01J 13/00* | (2006.01) |
| *H01G 4/12* | (2006.01) |
| *B82Y 30/00* | (2011.01) |
| *C01G 23/00* | (2006.01) |

(52) U.S. Cl.
CPC .............. *H01G 4/1227* (2013.01); *B82Y 30/00* (2013.01); *C01G 23/006* (2013.01); *B01J 13/0039* (2013.01); *C01P 2004/64* (2013.01); *C01P 2006/22* (2013.01)

(58) Field of Classification Search
CPC  H01G 4/1227; C01G 23/006; C01P 2004/64; C01P 2006/22; B01J 13/0008; B01J 13/0039

USPC .............. 516/33; 51/22; 977/785; 106/286.2, 106/286.4, 287.19
See application file for complete search history.

(56) References Cited

U.S. PATENT DOCUMENTS

| | | | | |
|---|---|---|---|---|
| 4,579,594 A | * | 4/1986 | Nanao et al. | 106/287.24 |
| 4,664,841 A | * | 5/1987 | Kitahara et al. | 252/62.56 |
| 4,668,299 A | * | 5/1987 | Nanao et al. | 106/419 |
| 4,749,506 A | * | 6/1988 | Kitahara et al. | 252/62.54 |
| 5,112,676 A | * | 5/1992 | Cot et al. | 427/226 |
| 5,514,822 A | * | 5/1996 | Scott et al. | 556/28 |
| 5,559,260 A | * | 9/1996 | Scott et al. | 556/28 |

(Continued)

FOREIGN PATENT DOCUMENTS

| | | | | |
|---|---|---|---|---|
| JP | 02-233505 | A | * | 9/1990 |
| JP | 03-069506 | A | * | 3/1991 |
| JP | 10-087329 | | | 4/1998 |

OTHER PUBLICATIONS

JPO on East, Patent Abstracts of Japan, Japan patent Office, Tokyo, Japan, JP402233505A (Sep. 1990), Abstract.*

(Continued)

*Primary Examiner* — Daniel S Metzmaier
(74) *Attorney, Agent, or Firm* — Arent Fox LLP (57) ABSTRACT

An ultrafine metal oxide particle dispersion liquid is prepared by mixing an ultrafine titanium-based composite metal oxide particle dispersion liquid prepared by hydrolysis in a microemulsion containing a hydrophobic dispersion medium, water, and a surfactant and an organic metal compound solution for the same titanium-based composite metal oxide at a ratio of 1:1 to 1:30 in terms of the composite metal oxide contained.

13 Claims, 3 Drawing Sheets

(56) References Cited

U.S. PATENT DOCUMENTS

| | | | |
|---|---|---|---|
| 5,645,891 | A | 7/1997 | Liu et al. |
| 5,654,456 | A * | 8/1997 | Scott et al. .................. 556/28 |
| 5,725,802 | A | 3/1998 | Chittofrati et al. |
| 6,413,489 | B1 | 7/2002 | Ying et al. |
| 7,819,965 | B2 * | 10/2010 | Yoshinaka et al. ....... 106/287.19 |
| 2002/0110519 | A1 * | 8/2002 | Ying et al. ................. 423/600 |
| 2008/0090006 | A1 * | 4/2008 | Yoshinaka et al. ........... 427/212 |

OTHER PUBLICATIONS

JPO on East, Patent Abstracts of Japan, Japan patent Office, Tokyo, Japan, JP403069506A (Mar. 1991), Abstract.*

Derwent Abstract, week 200953, London: Derwent Publications Ltd., AN 2004-329616, Class A18, WO 2004026762A (Apr. 2004), (Murata MFG Co Ltd) Abstract.*

Dow, Technical Data Sheet, TERGITOL™ NP-10 Surfactant, Product Information, Dow Chemical Co., Obtained @ http://www.dow.com/surfactants/products/nonylph.htm , (downloaded Sep. 10, 2012), pp. 1-2.*

Abicht et al, "Preparation, characterization and sintering behavior of barium titanate powders coated with Ba-, Ca-, Si- and Ti-components", Materials Chemistry and Physics, vol. 51 iss. 1 (Oct. 1997) pp. 35-41.*

Herrig et al, "A colloidal approach to nanometer-sized mixed oxide ceramic powders", Materials Letters, 27 (Aug. 1996), pp. 287-292.*

O'Brien et al., "Synthesis of Monodisperse Nanoparticles of Barium Titanate: Toward a Generalized Strategy of Oxide Nanoparticle Synthesis", Journal of the American Chemical Society, Dec. 5, 2001, vol. 123, Issue 48 (Publication Date (Web): Nov. 7, 2001), pp. 12085-12086.*

Urban et al., "Synthesis of Single-Crystalline Perovskite Nanorods Composed of Barium Titanate and Strontium Titanate", Journal of the American Chemical Society, Feb. 20, 2002, vol. 124, Issue 7 (Publication Date (Web): Jan. 29, 2002), pp. 1186-1187.*

Kamiya et al., "Preparation of Highly Dispersed Ultrafine Barium Titanate Powder by Using Microbial-Derived Surfactant", Journal of the American Ceramic Society, vol. 86, Issue 12, Dec. 2003 (published online: Dec. 20, 2004), pp. 2011-2018.*

2007. Avogadro's Law, Chemical Laws, Concentration, Molal, Molar, Mole. Hawley's Condensed Chemical Dictionary, online @ http://onlinelibrary.wiley.com/mrw/advanced/search?doi=10.1002/9780470114735 (Pub. Online: Mar. 15, 2007, DOI: 10.1002/9780470114735.hawley11066), pp. 1-2.*

JPO Machine translation of JP 10-87329, Japan Patent Office @ http://www.19.ipdl.inpit.go.jp/PA1/cgi-bin/PA1INDEX, (Sep. 7, 2007), pp. 2 of 2, 2 of 2 & 12 of 12.

Lewis, Richard J. Sr. (2002). Hawley's Condensed Chemical Dictionary (14th Edition). John Wiley & Sons. Online version available at http://knovel.com/web/portal/browse/display?_EXT_KNOVEL_DISPLAY_bookid=704&VerticalID=0, (09-203), entry "Molar", 2 pages.

Suyama, Yoko. "Synthesis of Single-Crystal Barium Titanium Isopropoxide Complex to Form Barium Titanate"; J. Am. Ceram. Soc.; vol. 77, No. 2; 1994; pp. 603-605.

Suyama, Yoko, et al. "Formation of $BaTiO_3$ from a Barium Titanium Isopropoxide Complex"; Jpn. J. Appl. Phys. vol. 36; 1997; pp. 5939-5942.

* cited by examiner

ULTRAFINE METAL OXIDE PARTICLE DISPERSION LIQUID AND ULTRAFINE METAL OXIDE PARTICLE THIN FILM

This is a division of application Ser. No. 11/052,759, filed Feb. 9, 2005, now abandoned.

BACKGROUND OF THE INVENTION

1. Field of the Invention

The present invention relates to ultrafine metal oxide particle dispersion liquids in which ultrafine metal oxide particles are dispersed and ultrafine metal oxide particle thin films composed of metal oxide nanoparticles and having excellent dielectric properties.

2. Description of the Related Art

In recent years, higher-performance devices have been intensively researched and developed with the increasing need for the miniaturization of devices. For example, composite metal oxides such as barium titanate and lead titanate zirconate are widely used for devices such as monolithic capacitors and actuators since such materials have excellent dielectric and piezoelectric properties. Development of smaller, higher-performance devices demands the establishment of techniques for manufacturing thinner, higher-quality films composed of finer particles.

One of such thin-film manufacturing techniques is the preparation of a coating liquid for thin films by a microemulsion method or metal organic decomposition process (MOD). The microemulsion method is schematically illustrated in FIG. 1.

Figure 1:
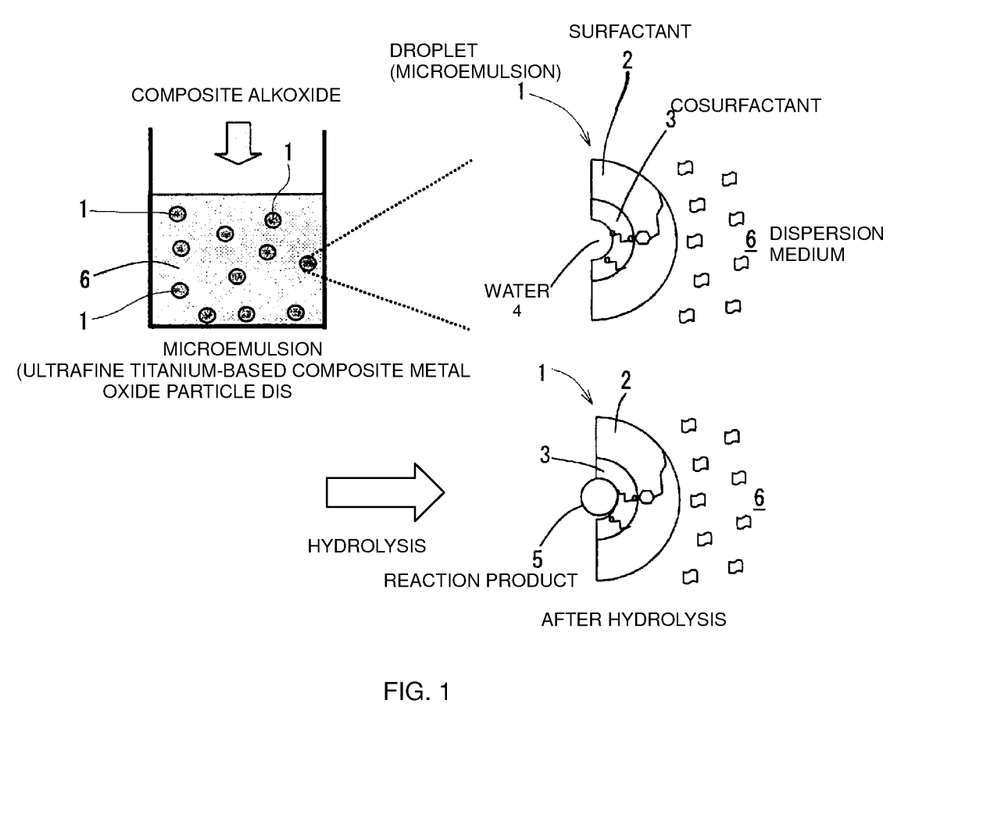
FIG. 1 shows schematic illustrations of a microemulsion and a droplet before and after hydrolysis.

FIG. 1 shows a schematic illustration of a microemulsion and enlarged sectional views (half) of a droplet 1 and its vicinity contained in the microemulsion before and after hydrolysis performed by adding a composite metal alkoxide. FIG. 1 shows the droplets 1 (in the microemulsion), a surfactant 2, a cosurfactant 3, water 4, a reaction product 5, and a dispersion medium 6, such as cyclohexane.

The microemulsion method is performed by adding water to a hydrophobic medium together with a surfactant to prepare a microemulsion in which fine water droplets (the droplets 1 in FIG. 1) are dispersed and then introducing and reacting a starting material in the water droplets through, for example, hydrolysis to produce crystallized ultrafine metal oxide particles having a small particle size distribution. A transparent dispersion liquid in which the resultant ultrafine metal oxide particles (also called metal oxide nanoparticles) are well dispersed and do not aggregate can be prepared by adjusting the content of water in the microemulsion to the minimum amount of water required for the hydrolysis.

This transparent dispersion liquid may be deposited by, for example, spin coating to form a thin film composed of fine nanoparticles having a size of about 20 nm.

On the other hand, MOD is a method for forming a thin film by applying (for example, by spin coating), drying, and firing a MOD coating liquid prepared by dissolving a metal alkoxide or carboxylate in, for example, an aromatic solvent.

Japanese Unexamined Patent Application Publication No. 10-87329, for example, discloses a coating liquid containing organic metal compounds produced by, for example, reacting an alkoxide or complex of a specific metal with an carboxylic anhydride, glycol, a β-diketone, or a dicarboxylic monoester. The organic metal compounds have high solubility to organic solvents, and the coating liquid has high storage stability. In addition, the coating liquid may be partially hydrolyzed for use as a sol-gel coating liquid to reduce the content of organic components in the coating liquid.

For example, a barium titanate ($BaTiO_3$) nanoparticle thin film formed with a transparent barium titanate nanoparticle dispersion liquid prepared by the microemulsion method with the minimum amount of water required for the hydrolysis has high crystallinity and excellent dielectric properties though the film is composed of fine particles having a size of 20 nm or less. This is probably because a gradual reaction does not allow the particles to take in excess water. In addition, this dispersion liquid, having high dispersibility and transparency, enables the production of an excellent thin film having uniformity and small surface roughness.

A coating liquid prepared by a conventional microemulsion method, however, undesirably requires the repetition of coating many times to form a thin film having a desired thickness because the concentration of the coating liquid is low and therefore the rate of deposition is low, namely 10 to 20 nm for each coating.

A higher rate of deposition for each coating is possible by the following approaches:

(1) The hydrophobic medium in the microemulsion is removed to condense the microemulsion, thereby increasing the concentration of the composite metal nanoparticles produced.

(2) The content of water in the microemulsion and the amount of metal alkoxide added, which corresponds to the content of water, are increased to increase the concentration of the composite metal nanoparticles.

(3) The amount of metal alkoxide added is increased with the composition of the microemulsion unchanged to increase the amount of residual metal alkoxide relative to that of the composite metal nanoparticles and increase the concentration of the composite metal nanoparticles.

According to the first approach, the removal of the hydrophobic medium increases the proportion of the residual surfactant, thus undesirably increasing the viscosity of the dispersion liquid and producing porous films due to loss of the surfactant during firing.

According to the second approach, the content of water for the hydrolysis in the microemulsion is increased to increase the possible amount of metal alkoxide added. In this approach, however, an increased content of water relative to that of metal alkoxide causes aggregation at the beginning of the addition of the metal alkoxide to the microemulsion to produce a cloudy dispersion liquid unless the metal alkoxide is exceptionally rapidly and uniformly added. Such a cloudy dispersion liquid is extremely difficult to disperse again.

According to the third approach, a dispersion liquid prepared by adding an excessive amount of metal alkoxide stock solution with the composition of the microemulsion unchanged contains a larger amount of residual unreacted metal alkoxide. In the microemulsion method, a metal alkoxide, which is readily hydrolyzed, is used because the hydrolysis must be performed with a small amount of water. The residual unreacted metal alkoxide is therefore readily hydrolyzed by moisture in air. As a result, this dispersion liquid undesirably exhibits low storage stability and repeatability.

On the other hand, a stock solution prepared by MOD has about several to tens of times as high a concentration as that prepared by the microemulsion method, thus providing a higher rate of deposition, namely 30 to 80 nm for each coating. In addition, the stock solution prepared by MOD is directly used in principle, thus allowing uniform deposition and less leakage current. Furthermore, MOD can be modified for improving the storage stability and preventing striation, and has also been studied for crystallization with high solubility at relatively low temperatures. MOD, however, has a fundamental problem: this method poses difficulty in providing good electrical properties, though producing an apparently good-quality film that is relatively dense and smooth. This is probably because the resultant film has insufficient crystallinity.

SUMMARY OF THE INVENTION

The present inventor has found that the above problem can be solved with an ultrafine metal oxide particle dispersion liquid prepared by mixing an ultrafine titanium-based composite metal oxide particle dispersion liquid (A) prepared by the microemulsion method and an organic metal compound solution (B) for the same titanium-based composite metal oxide with high storage stability at a ratio of A:B in the range of 1:1 to 1:30 (mols/liter) in terms of the composite metal oxide contained, thus completing the present invention. Using this dispersion liquid, an excellent titanium-based composite metal oxide nanoparticle thin film that has high dielectric properties and causes less leakage current can be produced at a higher rate of deposition for each coating.

According to this approach, the concentration of the dispersion liquid can be increased with no increase in the proportion of the surfactant in the microemulsion, thus increasing the rate of deposition for each coating. In addition, a dense, smooth thin film that has excellent electrical properties and causes less leakage current can be achieved because voids between the particles are filled with the MOD solution.

Accordingly, the present invention provides an ultrafine metal oxide particle dispersion liquid prepared by mixing an ultrafine titanium-based composite metal oxide particle dispersion liquid prepared by hydrolysis in a microemulsion containing a hydrophobic dispersion medium, water, and a surfactant and an organic metal compound solution for the same titanium-based composite metal oxide at a ratio of 1:1 to 1:30 in terms of the composite metal oxide contained.

Ultrafine particles herein refer to those having an average diameter of, for example, 100 nm or less.

Using the ultrafine metal oxide particle dispersion liquid according to the present invention, an excellent thin film that has high dielectric properties and causes less leakage current can be produced more efficiently at a higher rate of deposition for each coating.

The concentration of the surfactant in the ultrafine titanium-based composite metal oxide particle dispersion liquid is preferably 10% or less by volume of the hydrophobic dispersion medium. For such a concentration, a smaller amount of surfactant remains, thus reducing the viscosity of the dispersion liquid and preventing the production of porous films due to loss of the surfactant during firing. In addition, the concentration of the ultrafine titanium-based composite metal oxide particles is preferably 0.05 mol/l or less in terms of the composite metal oxide. For such a concentration, the resultant composite metal oxide nanoparticles can be highly dispersed to provide a transparent dispersion liquid.

The titanium-based composite metal oxide is preferably a perovskite oxide represented by $MTiO_3$, wherein M indicates at least one metal element selected from the group consisting of barium, calcium, and strontium.

The present invention further provides an ultrafine metal oxide particle thin film produced with the above ultrafine metal oxide particle dispersion liquid. This film has excellent dielectric properties, including a high relative dielectric constant.

DESCRIPTION OF THE PREFERRED EMBODIMENTS

Preferred embodiments of the present invention will now be described in detail.

A microemulsion used in the present invention is a water-in-oil (W/O) microemulsion containing a hydrophobic dispersion medium, water, and a surfactant. Ultrafine titanium-based composite metal oxide particles are formed in the microemulsion through hydrolysis. This microemulsion is mixed with an organic metal compound solution for the same titanium-based composite metal oxide at a ratio of 1:1 to 1:30 in terms of the composite metal oxide contained.

Examples of the hydrophobic dispersion medium used include petroleum hydrocarbons such as kerosene; nonpolar hydrocarbons such as cyclohexane, hexane, cyclopentane, benzene, and octane; ethers such as diethyl ether and isopropyl ether; and their mixtures.

Examples of the surfactant used include ionic surfactants such as AOT (sodium bis(2-ethylhexyl) sulfosuccinate) and SDS ($CH_3(CH_2)_{11}OSO_3Na$) and nonionic surfactants such as NP-n (n=1-10) (($p-C_9H_{19}$)—$C_6H_4$—O—$(CH_2CH_2O)_n$ $CH_2CH_2OH$) and polyoxyethylene(n) lauryl ether ($C_{12}H_{25}$ $(OCH_2CH_2)_nOH$). Among them, nonionic surfactants are preferred because ionic surfactants leave unnecessary components in the film produced.

The starting material for hydrolysis in the present invention is a titanium-based composite metal alkoxide prepared by mixing different metal alkoxides in an alcohol. Examples of the alcohol used include ethanol, propanol, butanol, and isopropyl alcohol; preferably, an alcohol corresponding to the individual metal alkoxides is used.

Examples of the composite metal alkoxide used, which is not particularly limited, include barium titanium methoxide, barium titanium ethoxide, barium titanium propoxide, barium titanium butoxide, strontium titanium methoxide, strontium titanium ethoxide, calcium titanium methoxide, calcium titanium ethoxide, magnesium titanium methoxide, and magnesium titanium ethoxide.

The organic metal compound solution for the same titanium-based composite metal oxide is exemplified by a solution containing a mixture of a titanium alkoxide and an organic compound of a metal other than titanium, such as barium, strontium, calcium, and magnesium. Examples of the solvent used for the solution include lower carboxylic acid solvents, alcohol solvents, polyalcohol solvents, ether solvents, ketone solvents, ester solvents, N-methyl-2-pyrrolidone, and N,N-dimethylacetamide.

Examples of lower carboxylic acid solvents include butyric acid, acetic acid, propionic acid, and valeric acid.

Examples of alcohol solvents include methanol, ethanol, propanol, butanol, amyl alcohol, cyclohexanol, and methylcyclohexanol.

Examples of polyalcohol solvents include ethylene glycol monomethyl ether, ethylene glycol monoacetate, diethylene glycol monomethyl ether, diethylene glycol monoacetate, propylene glycol monoethyl ether, propylene glycol monoacetate, dipropylene glycol monoethyl ether, and methoxybutanol.

Examples of ether solvents include methylal, diethyl ether, dipropyl ether, dibutyl ether, dianol ether, diethyl acetal, dihexyl ether, trioxane, and dioxane.

Examples of ketone solvents include acetone, methyl ethyl ketone, methyl propyl ketone, methyl isobutyl ketone, methyl amyl ketone, methyl cyclohexyl ketone, diethyl ketone, ethyl butyl ketone, trimethyl nonanone, acetonitrile acetone, dimethyl oxide, phorone, cyclohexanone, and diacetone alcohol.

Examples of ester solvents include ethyl formate, methyl acetate, ethyl acetate, butyl acetate, cyclohexyl acetate, methyl propionate, ethyl hydroxyisobutyrate, ethyl acetoacetate, ethyl lactate, methoxybutyl acetate, diethyl oxalate, and diethyl malonate.

The content of water in the microemulsion of the present invention is preferably 0.95 to 3 times the amount of water required for the hydrolysis of the starting material, namely a composite metal alkoxide.

The amount of water required for the hydrolysis of, for example, barium isopropoxide ($Ba(isop)_2$) and titanium isopropoxide ($Ti(isop)_4$) is determined by the following chemical formula:

$$Ba(isop)_2 + Ti(isop)_4 + 3H_2O \rightarrow BaTiO_3 + 6 \text{ isopropanol}$$

In this example, therefore, the hydrolysis of 1 mol of barium isopropoxide and 1 mol of titanium isopropoxide requires 3 mol of water. Accordingly, the content of water in the microemulsion must be 2.85 to 9 mol, namely 0.95 to 3 times the amount of water required for the hydrolysis.

It may be preferred to adjust the content of water to 1 times or less. If the content of water is 1 times or less, the hydrolysis completely consumes water to provide a significantly clear dispersion liquid containing an unreacted residue or amorphous particles having insufficient crystallinity. The unreacted or amorphous phase may infiltrate between the ultrafine particles constituting the resultant film to increase the density of the film and function as a sintering aid.

Nevertheless, the content of water is preferably at least 0.95 times because a higher proportion of unreacted or amorphous phase involves a lower proportion of crystal phase. More preferably, the content of water is 1.05 to 1.2 times. Within this range, the resultant dispersion liquid has high clarity and dispersibility and contains ultrafine composite metal oxide particles with high crystallinity.

Minimizing the amount of water remaining after the hydrolysis also has the effect of inhibiting variations in the composition of the composite metal oxide synthesized. In the synthesis of barium titanate by hydrolysis, for example, a modified stock solution containing an excessive amount of barium is generally used because barium partially dissolves into water; the Ba/Ti ratio is an important characteristic of the resultant material. If substantially no water remains after the hydrolysis as in the present invention, no barium ions dissolve into water, so that uniform target ultrafine particles can be produced with an unmodified stock solution. If, therefore, the content of water in the microemulsion is 0.95 to 3 times, preferably 1.05 to 1.2 times, the amount of water required for the hydrolysis, the resultant particles have substantially no variations in composition due to the dissolution of water-soluble components into water.

In addition, at least one alcohol is preferably added to the microemulsion as another surfactant, namely cosurfactant.

FIG. 1 shows a schematic illustration of the microemulsion and enlarged sectional views (half) of a droplet and its vicinity contained in the microemulsion before and after the hydrolysis performed by adding a composite metal alkoxide. FIG. 1 shows droplets 1 (contained in the microemulsion), a surfactant 2, a cosurfactant 3, water 4, a reaction product 5, and a dispersion medium 6, such as cyclohexane.

Adding at least one alcohol as a cosurfactant allows water droplets to be dispersed more stably in the preparation of the microemulsion. In addition, when the hydrolysis consumes water in the microemulsion to produce ultrafine composite metal oxide particles, the cosurfactant infiltrates between the surfactant and the composite metal oxide particles to keep the surfactant surrounding the particles. The composite metal oxide particles can therefore be dispersed as stably as water.

The cosurfactant infiltrates the hydrophilic part of the surfactant to reduce the interface energy to water and relieve the steric hindrance of the long carbon chain of the hydrophilic part. The alcohol used as the cosurfactant preferably has about four to ten carbon atoms, though the suitable number of carbon atoms depends on the length of the carbon chain of the hydrophilic part. An alcohol having less than four carbon atoms is undesirable because it is excessively hydrophilic and dissolves from the interface into water. On the other hand, an alcohol having more than ten carbon atoms is undesirable because it is excessively hydrophobic and has larger steric hindrance.

The starting material used is preferably a composite metal alkoxide formed by mixing metal alkoxides before the hydrolysis.

It is known that a barium alkoxide is readily polymerized in an alcohol. According to J. Am. Ceram. Soc., 77 [2] pp. 603-605 and Jpn. J. Appl. Phys. Vol. 36, pp. 5939-5942, a crystal of $BaTi(OCH(CH_3)_2)$—$C_6H_6$ can be obtained by maturing an isopropanol solution of barium and titanium in benzene. These documents have also indicated that benzene, which does not substantially dissolve metal alkoxides, has the effects of promoting the stabilization and precipitation of the $BaTi(OCH(CH_3)_2)$—$C_6H_6$ crystal and inhibiting the polymerization of the barium alkoxide.

Adding benzene in such an amount as to precipitate no crystal can inhibit the polymerization of a barium alkoxide to provide a uniform barium titanium double alkoxide more readily. To produce uniform ultrafine barium-containing composite metal oxide particles, therefore, a barium-containing composite alkoxide stock solution is preferably adjusted by adding benzene, which inhibits the polymerization of the barium alkoxide, to the alcohol solvent. A different material having the same effect may be used instead of benzene.

The microemulsion shown in FIG. 1 is mixed with the organic metal compound solution (MOD solution) for the same titanium-based composite metal oxide at a ratio of 1:1 to 1:30 in terms of the composite metal oxide contained (the titanium-based composite metal oxide versus the organic metal compound) to prepare an ultrafine metal oxide particle dispersion liquid according to the present invention.

The concentration of the surfactant in the ultrafine metal oxide particle dispersion liquid of the present invention is preferably 10% or less by volume of the hydrophobic dispersion medium. Its lower limit is a minimum value at which the surfactant can function effectively. In addition, the concentration of the ultrafine titanium-based composite metal oxide particles is preferably 0.05 mol/l or less in terms of the composite metal oxide.

An ultrafine metal oxide particle thin film according to the present invention is produced with the ultrafine metal oxide particle dispersion liquid of the present invention.

The ultrafine particles contained in the ultrafine metal oxide particle dispersion liquid may be heat-treated at a relatively low temperature, for example 600° C. or less, since they have high crystallinity.

The ultrafine metal oxide particle thin film of the present invention is composed of ultrafine metal oxide particles with an average diameter of 15 to 50 nm, and has ferroelectric properties.

As the ferroelectric properties, the ultrafine metal oxide particle thin film of the present invention preferably has a remanent polarization (2Pr) of 2 $\mu C/cm^2$ or more and a relative dielectric constant of 300 or more at a measurement frequency of 1 kHz at room temperature.

The ultrafine metal oxide particle thin film of the present invention, including ultrafine particles with an average diameter of 15 to 50 nm and having a remanent polarization (2Pr) of 2 $\mu C/cm^2$ or more and a relative dielectric constant of 300 or more, can function sufficiently in ferroelectric devices such as thin-film capacitors and monolithic capacitors. This ultrafine metal oxide particle thin film therefore enables the production of smaller, thinner-film devices. In particular, a thin-film capacitor including the film, which is composed of a larger number of particles, can achieve higher reliability, a smaller layer thickness, and a smaller device size.

The ultrafine metal oxide particle thin film of the present invention is preferably produced by synthesizing finest possible crystallized metal oxide particles, for example ceramic nanoparticles of a titanate-containing perovskite oxide; depositing the particles on a substrate while keeping them highly dispersed; and adding energy, such as heat, for growing the particles to a diameter of 15 to 50 nm to facilitate the densification and crystallization of the deposit.

In such a film deposition method, for example, a dispersion liquid prepared by a microemulsion (ME) method and containing highly dispersed metal oxide nanoparticles with a uniform particle size distribution is mixed with a MOD solution at the above ratio. The resultant coating liquid, for example the ultrafine metal oxide particle dispersion liquid of the present invention, is directly deposited by, for example, spin coating to form a thin film. This film is then heat-treated with, for example, a rapid thermal annealing (RTA) furnace.

In particular, the ultrafine metal oxide particle thin film of the present invention is preferably produced by synthesizing ultrafine metal oxide particles with an average diameter of 30 nm or less, for example ceramic nanoparticles of a titanate-containing perovskite oxide; depositing the ceramic nanoparticles on a substrate while keeping them highly dispersed in a dispersion medium; and adding energy to the resultant ceramic nanoparticle thin film by, for example, heat treatment to grow the particles to a diameter of 15 to 50 nm.

As described above, fine ceramic particles, or ceramic nanoparticles, have a strong tendency to aggregate, and aggregated particles are extremely difficult to disperse again. To synthesize target ceramic nanoparticles while keeping them highly dispersed in a dispersion medium, a starting material may be reacted in nanosized fine reaction spaces contained in the dispersion medium. The above microemulsion method is desirable as such a method. For the above W/O microemulsion, which contains a hydrophobic dispersion medium, water, and a surfactant, water droplets with a diameter of several to tens of nanometers can be thermally stably dispersed in the hydrophobic dispersion medium.

For example, a barium titanium composite alkoxide stock solution may be added dropwise to this microemulsion to synthesize crystallized barium titanate nanoparticles for use in monolithic capacitors. These nanoparticles are very fine and uniform because they have the diameter corresponding to the water droplets.

In addition, as described above, the synthesized barium titanate nanoparticles can be kept stably dispersed without aggregation by adjusting the content of water in the microemulsion to 0.95 to 3 times the amount of water required for the hydrolysis.

The synthesized nanoparticles are preferably as fine as possible, namely 30 nm or less, more preferably 10 nm or less, in average diameter because they must be grown within the range not exceeding 50 nm by the subsequent heat treatment. A dispersion liquid containing such nanoparticles is applied onto a substrate by, for example, spin coating, dip coating, or screen printing and is heat-treated for removing the organic solvent to achieve higher crystallinity, thus providing a dense barium titanate nanoparticle thin film.

The average diameter of the particles contained in the film may be adjusted after the deposition with, for example, an electric furnace, an infrared furnace, or an RTA furnace. In particular, an infrared furnace and an RTA furnace are desirable because these furnaces can provide a rapid temperature rise to suppress the growth of the particles to a smaller degree at the same temperature by short-time heat treatment.

The thin film of the ultrafine metal oxide particles synthesized by the microemulsion method is dense, in spite of nanoparticles, because these particles are deposited while keeping them highly dispersed. This film has also been crystallized and therefore forms no intermediate layer after, for example, heat treatment, thus preventing poor densification and large surface roughness. In addition, this film suffers no deterioration in electric properties due to the formation of a different phase at the interface to the substrate. Furthermore, in spite of a small average particle diameter, namely not more than 50 nm, this film is highly densified and crystallized to provide excellent dielectric properties and reliability because finest possible crystallized nanoparticles are grown by, for example, heat treatment.

Unlike powder samples, this ultrafine metal oxide particle thin film can exhibit ferroelectric properties even if the average diameter of the nanoparticles contained in the film is smaller than a generally accepted critical size. This possibility is related to effects such as stress from the substrate. In practice, an ultrafine metal oxide particle thin film produced according to the present invention has been confirmed to exhibit ferroelectric properties and excellent dielectric properties even though the particles contained in the film had an average diameter not more than 50 nm.

In addition, the above process of producing an ultrafine metal oxide particle thin film is advantageous in that this process includes fewer and simpler steps, namely a series of steps of synthesis, dispersion liquid, and deposition, and requires simpler equipment.

An example of electronic devices including the ultrafine metal oxide particle thin film of the present invention will now be described. The ultrafine metal oxide particle thin film of the present invention may be applied to various electronic devices. FIGS. 2A to 2D show an example of a monolithic capacitor including this film.

Figure 2A:
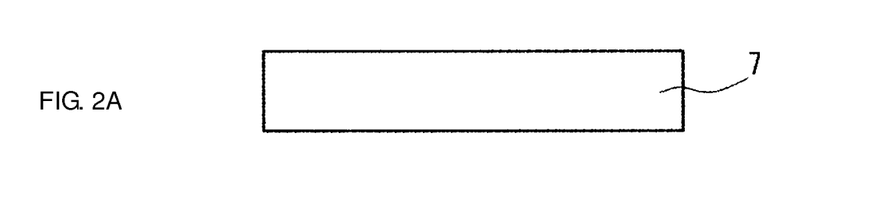
FIGS. 2A to 2D are sectional views for illustrating a process of producing a monolithic capacitor including ultrafine metal oxide particle thin films formed using an ultrafine metal oxide particle dispersion liquid of the present invention as a coating liquid.
Figure 2B:
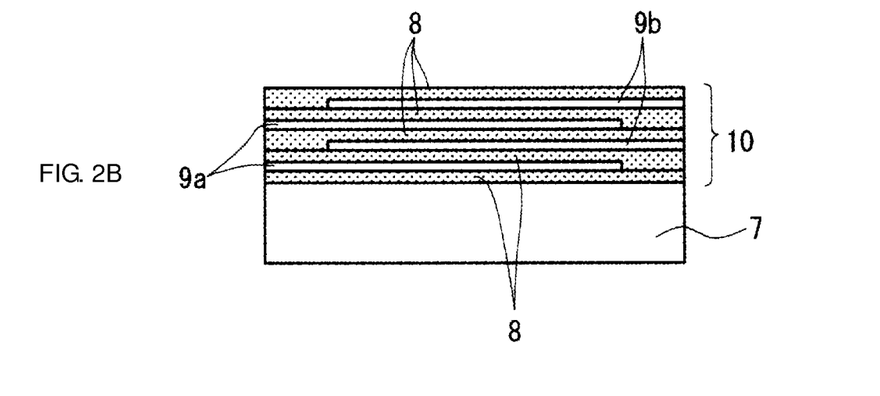

A ceramic layer 8, an internal electrode 9a, another ceramic layer 8, an internal electrode 9b, another ceramic layer 8, and another internal electrode 9a are deposited in the stated order on a substrate 7, such as an alumina substrate, shown in FIG. 2A. Referring to FIG. 2B, this deposition process is repeated to form a ceramic-metal laminate 10 including the internal electrodes 9a and 9b and ceramic layers 8 that are alternately laminated on the substrate 7.

The ceramic layers 8 are formed by the process for producing the ultrafine metal oxide particle thin film of the present invention while the internal electrodes 9a and 9b are formed by chemical vapor deposition (CVD), evaporation, or sputtering. The ceramic layers 8 and the internal electrodes 9a and 9b each have a thickness of, for example, 1 μm or less. The internal electrodes 9a and 9b are patterned with a mask and are alternately led to the opposite ends.

Figure 2C:
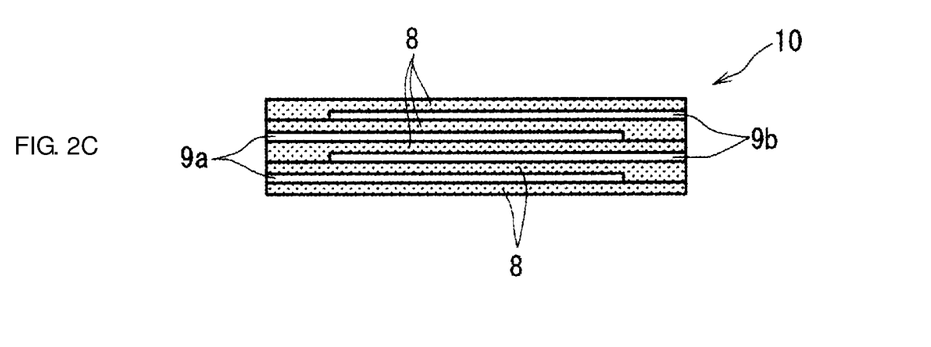
Figure 2D:
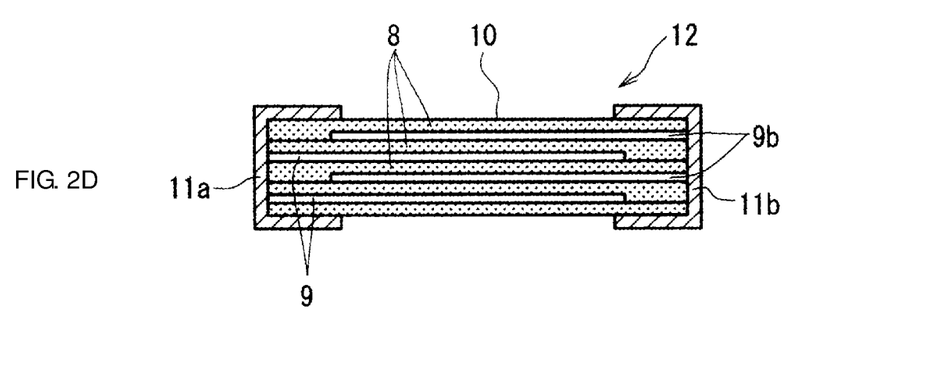

Referring to FIG. 2C, the substrate 7 is selectively removed by, for example, etching to leave the ceramic-metal laminate 10. Referring to FIG. 2D, external electrodes 11a and 11b are formed at both ends of the ceramic-metal laminate 10 by, for example, dipping or sputtering to produce a very small monolithic ceramic capacitor 12 in which the internal electrodes 9a are connected to one external electrode 11a and the internal electrodes 9b are connected to the other external electrode 11b.

Figure 3:
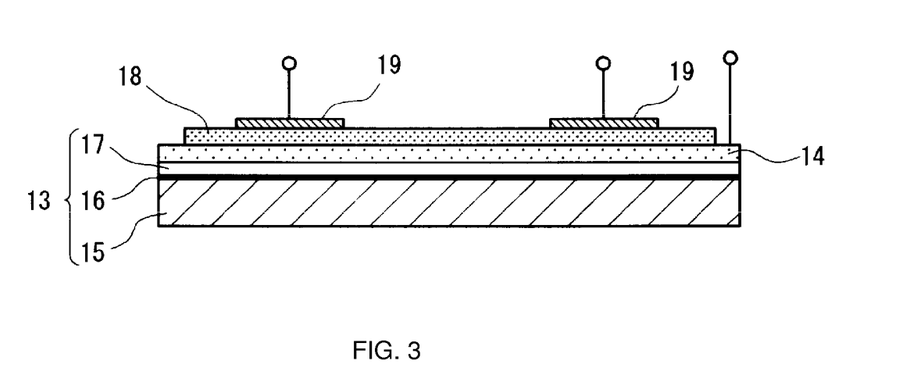
FIG. 3 is a sectional view of a thin-film device including an ultrafine metal oxide particle thin film formed using an ultrafine metal oxide particle dispersion liquid of the present invention as a coating liquid.

FIG. 3 shows an example of a dielectric thin-film device including the ultrafine metal oxide particle thin film of the present invention.

A substrate 13 that constitutes the lower layer of the dielectric thin-film device and a platinum film 14 that functions as a lower electrode on the substrate 13 are prepared by the following process. A surface of a monocrystalline silicon board 15 is oxidized to form a silicon oxide film 16 that functions as a buffer layer to prevent silicon from diffusing into the lower electrode, namely the platinum film 14. An aluminum oxide film 17 having a thickness of 1,000 Å is formed on the silicon oxide film 16 by sputtering to enhance the adhesion between the silicon oxide film 16 and the platinum film 14. The platinum film 14 is formed at a thickness of 3,000 Å on the substrate 13 including the silicon board 15, the silicon oxide film 16, and the aluminum oxide film 17.

A dielectric thin film 18 composed of ultrafine metal oxide particles with an average diameter of 15 to 50 nm according to the present invention is formed on the platinum film 14. Platinum electrodes 19 are formed as upper electrodes on the dielectric thin film 18 by sputtering.

EXAMPLES

The present invention will now be described in detail with examples below, though the present invention is not limited to these examples.

Example 1

First, 4 g of barium isopropoxide was mixed into 160 ml of isopropyl alcohol in a glove box containing an argon atmosphere to prepare a barium alkoxide solution. An equimolar amount of titanium isopropoxide solution was added dropwise into the barium alkoxide solution, which was mixed overnight to obtain a light yellow, transparent barium-titanium composite alkoxide stock solution.

A W/O microemulsion was prepared by mixing water, cyclohexane, as a dispersion medium, NP-10 ((p-$C_9H_{19}$)—$C_6H_4$—O—$(CH_2CH_2O)_{10}CH_2CH_2OH$), as a surfactant, and 1-octanol, as a cosurfactant, at a ratio of 0.2:150:7.5:9, respectively, while bubbling the mixture with an argon gas. The barium-titanium composite alkoxide stock solution was then added to the microemulsion with a micropipette so that the content of water in the microemulsion was 1.2 times the amount of water required for the hydrolysis of the barium-titanium composite alkoxide. This mixture was stirred in a glove box containing an argon atmosphere for one day to prepare an ultrafine barium titanate particle dispersion liquid (A).

This dispersion liquid (A) was transparent light brown and contained highly dispersed ultrafine barium titanate particles produced by the hydrolysis. A portion of the dispersion liquid (A) was mixed with ethanol to cause precipitation and was centrifuged and washed with an organic solvent to obtain a crystal phase. According to powder X-ray diffractometry, the resultant crystal phase was a barium titanate crystal. In addition, according to observation by high-resolution scanning electron microscopy (SEM), the resultant ultrafine particles had an extremely small diameter, namely about 8 nm, and a uniform particle size distribution.

Equimolar amounts of n-barium butyrate and titanium isopropoxide were mixed into isoamyl butyrate. Then, 10 g of 2,4-pentadione was added to prepare 200 ml of an MOD solution (B) having a concentration of 0.3 mol/l in terms of barium titanate (BT).

The dispersion liquid (A) and the solution (B) were mixed at a ratio of 1:1, 1:10, and 1:30 in terms of BT to prepare coating liquids for barium titanate nanoparticle thin films.

The resultant coating liquids were used to form ultrafine barium titanate particle thin films by spin coating. Thin films having a thickness of 240 nm were formed by repeating a process of spin coating and heat treatments at 150° C. and 450° C. and firing the films at 700° C. for 20 minutes. The number of coatings was adjusted so that the final thickness of each film reached 240 nm.

Upper electrodes were formed on the barium titanate nanoparticle thin films by Pt sputtering to evaluate their electrical properties. The relative dielectric constant and dielectric loss of each film were measured with an LCR meter at a measurement frequency of 1 kHz at room temperature. The ferroelectric properties of each film were evaluated by hysteresis measurement. These evaluations are shown in Table 1 below.

In addition, the withstand voltage of each film was evaluated by applying a voltage of 200 kV/cm onto the film. In this test, broken films were determined as "Bad", and unbroken films were determined as "Good".

Furthermore, the storage stability of each coating liquid was evaluated after storage at 25° C. for ten days in a glass vial sealed in air. Coating liquids in which foreign materials occurred or those that distinctly changed in color were determined as "Bad", and unchanged coating liquids were determined as "Good".

Comparative Example 1

A dispersion liquid (A) and solution (B) were prepared in the same manner as Example 1, and were mixed at a ratio of 1:0, 0:1, 1:0.5, and 1:35 in terms of barium titanate to prepare coating liquids for barium titanate nanoparticle thin films. As in Example 1, thin films were formed with the coating liquids and were evaluated for electrical properties.

Comparative Example 2

A dispersion liquid (A) was prepared in the same manner as Example 1. Cyclohexane was removed from the dispersion liquid (A) with an evaporator until its volume was reduced to ⅕ of the original volume, thus obtaining a coating liquid for barium titanate nanoparticle thin films. As in Example 1, a thin film was formed with the coating liquid and was evaluated for electrical properties.

Comparative Example 3

A microemulsion and composite alkoxide stock solution were prepared in the same manner as Example 1. The composite alkoxide stock solution was then added to the microemulsion in an amount of 5 times that equivalent to the content of water. This mixture was stirred in a glove box containing an argon atmosphere for one day to prepare a dispersion liquid (A).

As in Example 1, a thin film was formed with the dispersion liquid (A) and was evaluated for electrical properties. The storage stability of the dispersion liquid (A) was also evaluated as in Example 1.

Table 1 shows the evaluations of Example 1 and Comparative Examples 1 to 3.

TABLE 1

|  | Dispersion A:solution B (in terms of BT) | Number of coatings | Withstand voltage | Relative dielectric constant | Dielectric loss (%) | Hysteresis | Storage stability | Comprehensive evaluation |
| --- | --- | --- | --- | --- | --- | --- | --- | --- |
| Example 1 | 1:1 | 10 | Good | 760 | 2 | Good | Good | Good |
| Example 1 | 1:10 | 8 | Good | 650 | 3 | Good | Good | Good |
| Example 1 | 1:30 | 6 | Good | 480 | 3 | Good | Good | Good |
| Comparative Example 1 | 1:0 | 20 | Good | 790 | 2 | Good | Good | Bad |
| Comparative Example 1 | 0:1 | 4 | Good | 180 | 3 | Bad | Good | Bad |
| Comparative Example 1 | 1:0.5 | 16 | Good | 780 | 3 | Good | Good | Bad |
| Comparative Example 1 | 1:35 | 5 | Good | 290 | 3 | Bad | Good | Bad |
| Comparative Example 2 | 1:0 | 9 | Bad | 600 | 8 | — | Bad | Bad |
| Comparative Example 3 | 1:0 | 10 | Bad | 540 | 5 | Good | Bad | Bad |

When the microemulsion was used alone, the resultant film had excellent dielectric properties, including a high relative dielectric constant. The deposition of the film, however, required 20 coatings to reach a thickness of 240 nm.

When the coating liquids prepared by mixing the dispersion liquid and the MOD solution at ratios of 1:1 to 1:30 in terms of BT were used, thin films having the same thickness could be formed by ten or fewer coatings. In addition, these films had relative dielectric constants not less than 300 and dielectric losses of 3% or less.

When the amount of the MOD solution mixed was less than 1 times that of the dispersion liquid, the deposition of a thin film required more than 10 coatings. When, on the other hand, the amount of the MOD solution mixed was more than 30 times that of the dispersion liquid, the resultant film had a relative dielectric constant less than 300 and exhibited substantially no hysteresis.

When the MOD solution was used alone, a thin film having the same thickness could be formed by fewer coatings. This film, however, had insufficient electrical properties. When the hydrophobic medium contained in the microemulsion was removed by evaporation to increase its concentration, a thin film could be formed by fewer coatings. This film, however, was porous because the proportion of the surfactant in the microemulsion was increased. As a result, the film exhibited a lower withstand voltage and a larger dielectric loss.

When the amount of composite alkoxide stock solution added to the microemulsion was 5 times the amount equivalent to that of water required for the hydrolysis, a thin film could be formed by fewer coatings. This film, however, exhibited an insufficient withstand voltage due to residual carbon and a dielectric loss not less than 3%. After a period of storage, the coating liquid changed in color from light brown to dark brown. This change revealed that the coating liquid had poor storage stability.

According to the present invention, as described above, an ultrafine metal oxide particle dispersion liquid is prepared by mixing an ultrafine titanium-based composite metal oxide particle dispersion liquid (A) prepared by the microemulsion method and an organic metal compound solution (B) for the same composite metal oxide with high storage stability at a ratio of A:B in the range of 1:1 to 1:30 in terms of the composite metal oxide contained. This dispersion liquid enables the production of an excellent titanium-based composite metal oxide nanoparticle thin film that has high dielectric properties and causes less leakage current at a higher rate of deposition for each coating.

What is claimed is:

1. A method of making an ultrafine metal oxide particle dispersion liquid which comprises
   (a) providing an ultrafine titanium-based composite metal oxide particle dispersion liquid which is the product of titanium compound hydrolysis in a microemulsion comprising a hydrophobic dispersion medium, water and a surfactant, and in which said titanium-based composite metal oxide is a perovskite oxide represented by $MTiO_3$ in which M is at least one metal element selected from the group consisting of barium, calcium, and strontium,
   (b) providing a solution containing an organic precursor which forms said titanium-based composite metal oxide which is actually present in the dispersion liquid (a), and
   (c) combining a quantity of the dispersion liquid (a) with a quantity of the precursor solution (b) such that the resulting ratio of said ultrafine titanium-based composite metal oxide particles in (a) to said composite metal oxide which can be formed by the precursor in the precursor solution (b) is 1:1 to 1:30 in terms of mols/liter of said particles and oxide.

2. The method according to claim 1, wherein the concentration of the surfactant in the ultrafine titanium-based composite metal oxide particle dispersion liquid is 10% or less by volume of the hydrophobic dispersion medium, and the concentration of the ultrafine titanium-based composite metal oxide particles is 0.05 mol/l or less.

3. The method according to claim 2, wherein M is barium.

4. The method according to claim 3, wherein the surfactant is nonionic.

5. The method according to claim 4, wherein the amount of water in (a) before hydrolysis was 0.95 to 3 times the amount required for the hydrolysis to form the ultrafine titanium-based composite metal oxide particles therein.

6. A method of forming a film on a substrate which comprises performing the method according to claim 5, and applying the product of the combination of (c) to a substrate and forming an ultrafine metal oxide particle thin film on the substrate.

7. A method of forming a film on a substrate which comprises performing the method according to claim 4, and applying the product of the combination of (c) to a substrate and forming an ultrafine metal oxide particle thin film on the substrate.

8. A method of forming a film on a substrate which comprises performing the method according to claim 2, and further comprising applying the mixture product of the combination of (c) to a substrate and forming an ultrafine metal oxide particle thin film on the substrate.

9. The method according to claim 2, wherein the amount of water in (a) before hydrolysis was 0.95 to 3 times the amount required for the hydrolysis to form the ultrafine titanium-based composite metal oxide particles therein.

10. The method according to claim 1, wherein the surfactant is nonionic.

11. The method according to claim 1, wherein the amount of water in (a) before hydrolysis was 0.95 to 3 times the amount required for the hydrolysis to form the ultrafine titanium-based composite metal oxide particles therein.

12. The method according to claim 11, wherein the amount of water in (a) before hydrolysis was 1.05 to 1.2 times the amount required for the hydrolysis to form the ultrafine titanium-based composite metal oxide particles therein.

13. The method of forming a film on a substrate which comprises performing the method according to claim 1, and further comprising applying the mixture product of the combination of (c) to a substrate and forming an ultrafine metal oxide particle thin film on the substrate.

* * * * *